United States Patent
Sasaki et al.

(10) Patent No.: US 7,212,215 B2
(45) Date of Patent: May 1, 2007

(54) APPARATUS AND METHOD FOR RENDERING AN ANTIALIASED IMAGE

(75) Inventors: Nobuo Sasaki, Kanagawa (JP); Masaaki Oka, Kanagawa (JP)

(73) Assignee: Sony Computer Entertainment Inc. (JP)

(*) Notice: Subject to any disclaimer, the term of this patent is extended or adjusted under 35 U.S.C. 154(b) by 0 days.

(21) Appl. No.: 09/935,891

(22) Filed: Aug. 23, 2001

(65) Prior Publication Data

US 2002/0101435 A1    Aug. 1, 2002

(30) Foreign Application Priority Data

Aug. 23, 2000  (JP) .............................. 2000-252148
Aug. 8, 2001   (JP) .............................. 2001-241292

(51) Int. Cl.
*G09G 5/00*    (2006.01)

(52) U.S. Cl. ...................... 345/611; 345/613; 345/612; 345/614

(58) Field of Classification Search ................ 345/611, 345/613, 612, 614
See application file for complete search history.

(56) References Cited

U.S. PATENT DOCUMENTS

| | | | |
|---|---|---|---|
| 5,742,277 A * | 4/1998 | Gossett et al. | 345/611 |
| 5,838,298 A * | 11/1998 | Shirasaka | 345/611 |
| 5,940,080 A * | 8/1999 | Ruehle et al. | 345/611 |
| 5,995,649 A * | 11/1999 | Marugame | 382/154 |
| 6,052,131 A | 4/2000 | Oka | |
| 6,166,717 A * | 12/2000 | Nakayama | 345/611 |
| 6,377,273 B1 * | 4/2002 | Lee et al. | 345/611 |
| 6,411,290 B1 * | 6/2002 | Sasaki | 345/418 |
| 6,426,755 B1 * | 7/2002 | Deering | 345/581 |
| 6,437,793 B1 * | 8/2002 | Kaasila | 345/611 |
| 6,496,187 B1 * | 12/2002 | Deering et al. | 345/419 |
| 6,683,617 B1 * | 1/2004 | Naoi et al. | 345/613 |

FOREIGN PATENT DOCUMENTS

| | | |
|---|---|---|
| EP | 0 415 292 A2 | 3/1991 |
| EP | 676-723 A2 | 10/1995 |
| JP | 7-282274 A1 | 10/1995 |
| JP | 09-259290 A1 | 10/1997 |
| JP | 09-319892 A1 | 12/1997 |

OTHER PUBLICATIONS

"Simple Antialiasing Line Algorithm", IBM Technical Disclosure Bulletin, vol. 37, No. 5 (May 1994) pp. 61-63.

* cited by examiner

*Primary Examiner*—Kee M. Tung
*Assistant Examiner*—Mike Rahmjoo
(74) *Attorney, Agent, or Firm*—Lerner, David, Littenberg, Krumholz & Mentlik, LLP

(57) ABSTRACT

A main CPU extracts a contour and a contour candidate, which are visually important parts of an image to be rendered, according to, for example, polygon data representing an image of one frame. Further, a GPU performs rendering on data stored in a graphic memory according to the polygon data representing the image. Moreover, the GPU performs antialiasing on the contour and contour candidate extracted by the main CPU. Then, the GPU overwrites data representing the antialiased contour and contour candidate onto the data representing the image stored in the graphic memory.

22 Claims, 7 Drawing Sheets

APPARATUS AND METHOD FOR RENDERING AN ANTIALIASED IMAGE

CROSS REFERENCE TO RELATED APPLICATIONS

This application claims the benefits of Japanese Patent Application Numbers: 2000-252148, filed Aug. 23, 2000; and 2001-241292, filed Aug. 8, 2001, the entire disclosures of which are hereby incorporated by reference.

BACKGROUND OF THE INVENTION

The present invention relates to an apparatus and method for rendering an antialiased image, which are suitable for use in an entertainment system, such as a game machine, and a computer system.

Nowadays, the advent of highly-integrated, high-speed processors and memories has enabled real-time generation of three-dimensional images, which has hitherto been difficult to achieve. Thus, for example, a video-game machine is enabled to display three-dimensional images with realism.

When a three-dimensional image is displayed, the three-dimensional image is resolved into a plurality of polygons (that is, unit figures). Then, the entire three-dimensional image is rendered by rendering each of these polygons.

Practically, the displaying of this three-dimensional image is performed by performing geometry processing, such as coordinate transformation, clipping processing and lighting processing, on data representing the polygons which constitute the three-dimensional image, and then performing perspective projection conversion processing on resultant data obtained by such geometry processing to thereby convert three-dimension space data into data representing pixels arranged on a two-dimensional plane.

When such a three-dimensional image is rendered, the position of each of the polygons, which is represented by a floating or fixed point number, is converted into an integer number so as to be made to correspond to a pixel located at a fixed position on the screen of a display apparatus. Thus, aliasing occurs. Further, stair-step-like distortions called "jaggies" of a display image are caused owing to this aliasing. An occurrence of such aliasing or a jaggy may give a sense of incongruity to a user watching the three-dimensional image. Especially, in the case that this three-dimensional image is a dynamic image, flicker may be caused in this image.

Thus, a conventional image rendering apparatus reduces jaggies by virtually dividing each pixel into finer units called "sub-pixels" and then calculating the intensity of light of each of the sub-pixels according to a ray tracing method and thereafter averaging the calculated intensities of light of the sub-pixels of each pixel.

Further, another conventional image rendering apparatus reduces the jaggies by first generating a high-resolution image and then performing filtering on the image thereby to decrease the number of pixels and to antialias the image.

However, generally, a dynamic image comprises 20 to 30 frames or so per second. Thus, the rendering of a dynamic image needs to perform the calculation of the intensity of light of each of the sub-pixels according to the ray tracing method 20 to 30 times per second. Therefore, the former conventional image rendering apparatus, has drawbacks in that such calculations take time and that a dynamic image cannot be antialiased in real time.

Furthermore, the latter conventional image rendering apparatus, which is adapted to antialias (that is, reduce jaggies) by first generating a high-resolution image and then performing filtering on the image thereby to decrease the number of pixels, has drawbacks in that a buffer memory and a Z-buffer, each of which has large capacity and operates at a high speed, are needed when a dynamic image is displayed, and, thus, increasing the manufacturing cost and size of the apparatus increase.

SUMMARY OF THE INVENTION

The invention is accomplished in view of the aforementioned drawbacks of the conventional apparatuses. Accordingly, an object of the invention is to provide an image rendering apparatus of a low-cost small-sized configuration, which is enabled to reduce jaggies in real-time, and to provide an image rendering method enabled to reduce jaggies in real-time, a storage medium for storing a image rendering program enabled to reduce jaggies in real-time, and a server apparatus for distributing such an image rendering program.

To achieve the foregoing object, according to an aspect of the present invention, there is provided an image rendering apparatus that comprises an image rendering means for rendering an image, an antialiased image forming means for forming a partially antialiased image by extracting data corresponding to a predetermined line part of the rendered image and performing antialiasing processing on the extracted data, and overwriting means for overwriting the formed partially antialiased image onto the image rendered by the image rendering means.

Thus, according to the invention, data corresponding to, for example, a predetermined line part of an edge portion of a rendered image is extracted. Subsequently, antialiasing is performed on the extracted data. Thus, a partial antialiased image is formed. Then, this partial antialiased image is overwritten onto the rendered image.

Consequently, an image, in which jaggies are reduced by performing partially antialiasing thereon, is obtained. Further, because the image is partially antialiased, jaggies in the image are reduced at a high speed even when low-speed and low-cost devices are used. Thus, it is possible to make the apparatus of a low-cost simple configuration perform an operation of reducing jaggies on a dynamic image in real time.

Further, according to another aspect of the invention, there is provided an image rendering method that comprises the steps of rendering an image by an image rendering means, forming a partially antialiased image by extracting data corresponding to a predetermined line part of the rendered image and performing antialiasing processing on the extracted data, and overwriting the partially antialiased image onto the rendered image.

Thus, according to the invention, data corresponding to, for example, a predetermined line part of an edge portion of a rendered image is extracted. Subsequently, antialiasing is performed on the extracted data. Thus, a partial antialiased image is formed. Then, this partial antialiased image is overwritten onto the rendered image.

Consequently, an image, in which jaggies are reduced by performing partially antialiasing thereon, is obtained. Further, because the image is partially antialiased, jaggies in the image are reduced at a high speed even when low-speed and low-cost devices are used. Thus, it is possible to make the apparatus of a low-cost simple configuration perform an operation of reducing jaggies on a dynamic image in real time.

Furthermore, according to another aspect of the invention, there is provided a storage medium for storing a computer program. This program comprises the steps of rendering an image by an image rendering means, forming a partially antialiased image by extracting data corresponding to a predetermined line part of the rendered image and performing antialiasing processing on the extracted data, and overwriting the partially antialiased image onto the rendered image.

Thus, according to the invention, data corresponding to, for example, a predetermined line part of an edge portion of a rendered image is extracted by executing the computer program stored on the storage medium. Subsequently, antialiasing is performed on the extracted data. Thus, a partial antialiased image is formed. Then, this partial antialiased image is overwritten onto the rendered image.

Consequently, an image, in which jaggies are reduced by performing partially antialiasing thereon, is obtained. Further, because the image is partially antialiased, jaggies in the image are reduced at a high speed even when low-speed and low-cost devices are used. Thus, it is possible to make the apparatus of a low-cost simple configuration perform an operation of reducing jaggies on a dynamic image in real time.

Further, according to another aspect of the invention, there is provided a server apparatus that comprises a storage medium for storing a computer program. This program comprises the steps of rendering an image by an image rendering means, forming a partially antialiased image by extracting data corresponding to a predetermined line part of the rendered image and performing antialiasing processing on the extracted data, and overwriting the partially antialiased image onto the rendered image. This server apparatus further comprises distributing means for distributing a computer program stored on the storage medium.

The distributing means includes, for example, means for distributing the computer program in a wireless manner, in addition to means for distribution of the computer program in a wired way through a communication network, such as the Internet.

Thus, according to the invention, data corresponding to, for example, a predetermined line part of an edge portion of a rendered image is extracted by executing the computer program distributed by the server. Subsequently, antialiasing is performed on the extracted data. Thus, a partial antialiased image is formed. Then, this partial antialiased image is overwritten onto the rendered image.

Consequently, an image, in which jaggies are reduced by performing partially antialiasing thereon, is obtained. Further, because the image is partially antialiased, jaggies in the image are reduced at a high speed even when low-speed and low-cost devices are used. Thus, it is possible to make the apparatus of a low-cost simple configuration perform an operation of reducing jaggies on a dynamic image in real time.

Further, according to another aspect of the invention, there is provided a computer program that comprises a step of performing, when an image is rendered, antialiasing on at least a limited portion including a predetermined line part of the image. Thus, an image, in which aliasing and jaggy are reduced partially, is obtained.

DESCRIPTION OF THE PREFERRED EMBODIMENTS

Figure 1:
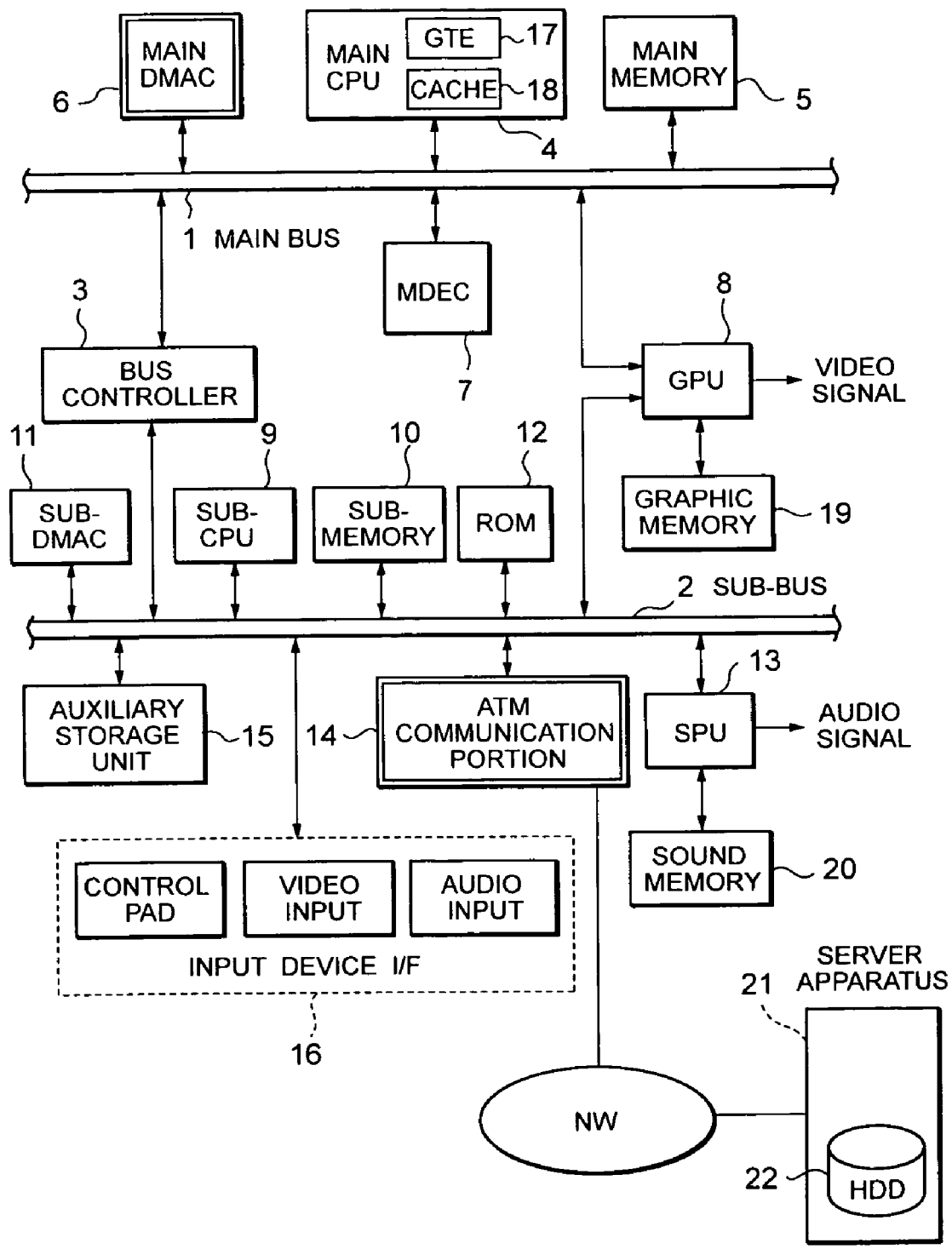
FIG. 1 is a block view illustrating a video-game machine that is an embodiment of the invention.

FIG. 1 illustrates a video-game machine to which an image rendering apparatus of the present invention is applied. This video-game machine has two kinds of bus lines, that is, a main bus 1 and a sub-bus 2, which serve as bus lines for performing data transmission in each block. The main bus 1 and the sub-bus 2 are connected to each other through a bus controller 3. The main bus 1 is used as a bus line for high-speed data transmission, while the sub-bus 2 is used for low-speed data transmission. The rapidity of the main bus 1 is ensured by transmitting data, which may be transmitted at a low speed, by using the sub-bus 2.

The main bus 1 is connected to a main CPU (Central Processing Unit) 4 comprising, a microprocessor for example, a main memory 5 including, a RAM (Random Access Memory) for example, a main DMAC (Direct Memory Access Controller) 6, an MDEC (MPEG (Moving Picture Experts Group) Decoder) 7, and a GPU (Graphic Processor Unit) 8, in addition to the bus controller 3.

The sub-bus 2 is connected to the GPU 8, a sub-CPU 9 similar to the main CPU 4 for example, a sub-memory 10 similar to the main memory 5 for example, a sub-DMAC 11, a ROM (Read-Only Memory) 12 for storing an operating system etc., an SPU (Sound Processing Unit) 13, an ATM (Asynchronous Transmission Mode) communication portion 14, an auxiliary storage unit 15, and an input device I/F (interface) 16, in addition to the bus controller 3.

The bus controller 3 performs a connection control operation of either disconnecting the main bus 1 from the sub-bus 2 or connecting the main bus 1 to the sub-bus 2 according to circumstances.

When the main bus 1 is disconnected from the sub-bus 2, devices connected to the main bus 1 cannot access devices connected to the sub-bus 2 and vice versa.

In contrast, when the sub-bus 2 is connected to the main bus 1, devices connected to main bus 1 can access devices connected to the sub-bus 2, and vice versa.

In an initial state (just after power-up of this video-game machine), the bus controller 3 is adapted to perform a control operation in such a way as to connect the main bus 1 to the sub-bus 2 (that is, bring the main bus 1 and the sub-bus 2 into an open state).

The main CPU 4 performs various kinds of control operations according to a program stored in the main memory 5. Practically, for example, when this video-game machine is booted, the main CPU 4 reads a boot program from the ROM 12 connected to the sub-bus 2 through the bus controller 3, and boots the video-game machine. Then, the main CPU 4 loads application programs (in this case, game programs and an image rendering program (to be described later)) and necessary data into the main memory 5 and the sub-memory 10 from the auxiliary storage unit 15 such as a disk drive unit, and executes the application programs.

Furthermore, a GTE (Geometry Transfer Engine) 17 is provided in the main CPU 4. This GTE 17 has a parallel processing system for simultaneously performing a plurality of operations. Further, the GTE 17 performs arithmetic operations for geometry processing, such as coordinate transformation, light source calculation, matrix operations, and vector operations, at a high speed in response to requests from the CPU 4. Moreover, the GTE 17 generates polygon data representing polygons, which constitute a three-dimensional image to be displayed, and supplies the generated polygon data to the main CPU 4.

When receiving the polygon data from the GTE 17, the CPU 4 obtains two-dimensional space data by performing perspective projection conversion on the received data. Subsequently, the main CPU 4 transfers the generated data to the GPU 8 through the main bus 1 at a high speed.

Furthermore, a cache memory (or cache) 18 is provided in the main CPU 4. Thus, the main CPU 4 can speed up data processing by accessing this cache memory 18 instead of the main memory 5.

The main memory 5 stores the programs, as described above, and the data which is needed for the data processing in the main CPU 4.

The main DMAC 6 performs a DMA transfer control operation on devices on the main bus 1. Further, when the bus controller 3 is in the open state, the main DMAC 5 performs the DMA transfer control operation on the devices on the sub-bus 2 in addition to the devices on the main bus 1.

The MDEC 7 is an I/O device that can operate concurrently with the main CPU 4. Further, the MDEC 7 functions as an image expansion engine and reproduces image data compression-coded by utilizing, for example, MPEG techniques.

The GPU 8 functions as a rendering processor. That is, the GPU 8 calculates pixel data representing pixels of the polygons according to the color data of the vertices of the polygons and the Z-values representing the depth thereof from a viewpoint. Thereafter, the GPU 8 writes (or renders) the calculated pixel data to the graphic memory 19. Thus, an image rendering operation is performed. Moreover, the GPU 8 reads pixel data rendered onto the graphic memory 19 and outputs the pixel data in the form of a video signal.

Incidentally, the GPU 8 fetches polygon data from the main DMAC 6 and the devices on the sub-bus 2. Then, the GPU 8 performs rendering according to the polygon data.

Figure 2:
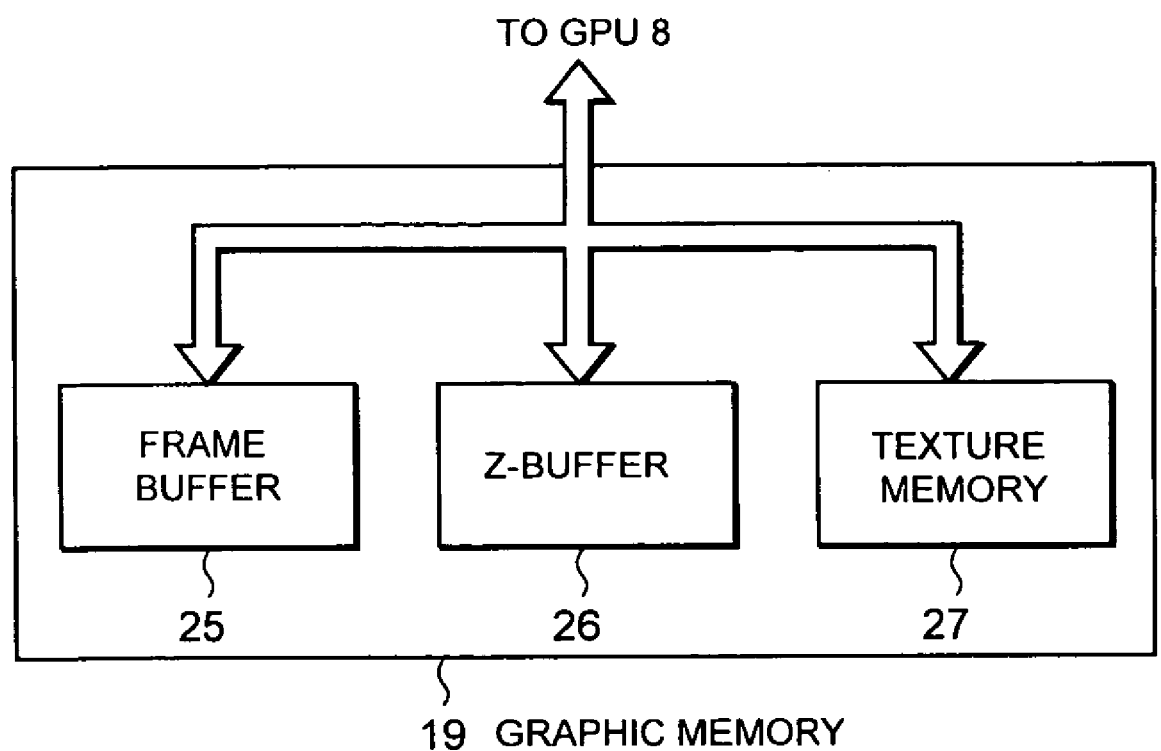
FIG. 2 is a block view illustrating a graphic memory provided in the video-game machine.

The graphic memory 19 comprises a DRAM etc. for example, and has a frame buffer 25, a Z-buffer 26 and a texture memory 27, as illustrated in FIG. 2.

The frame buffer 25 has (what is called) a dual buffer configuration and has a storage capacity of two frames. That is, the frame buffer 25 has first and second frame buffers (sub-buffers), each of which has a storage capacity that is sufficient to store pixel data of one frame. The frame buffer 25 is constructed so that pixel data written to the second frame sub-buffer is read while pixel data is written to the first frame sub-buffer, and that pixel data written to the first frame sub-buffer is read during pixel data is written to the second frame sub-buffer. That is, the frame sub-buffers are alternately assigned to a buffer used for displaying pixel data, that is, a buffer used for reading pixel data therefrom corresponding to each frame, and the other frame sub-buffer is assigned to a buffer used for writing pixel data thereto. In other words, sub-buffers respectively assigned to the buffer used for reading pixel data therefrom, and the buffer used for writing pixel data thereto are switched between the first and second frame sub-buffers every frame.

The Z-buffer 26 has storage capacity sufficient to store Z-values of one frame. This Z-buffer 26 is adapted to store a Z-value of a frontmost polygon, which is located nearest to a user watching the screen, of an image to be displayed on the screen. The texture memory 27 is adapted to store data of textures to be attached to the polygons.

The GPU 8 is adapted to perform rendering by using the frame buffer 25, the Z-buffer 26, and the texture memory 27. That is, the GPU 8 causes the Z-buffer 26 to store a Z-value of a frontmost one of the polygons constituting a three-dimensional image, and determines according to the stored Z-value whether or not pixel data is rendered onto the frame buffer 25. When the pixel data is rendered thereonto, the GPU 8 reads data representing the texture from the texture memory 27 and then obtains the pixel data by using the read data. Subsequently, the GPU 8 renders the pixel data to the frame buffer 25.

As illustrated in FIG. 1, the sub-CPU 9 performs various kinds of processing by reading the programs stored in the sub-memory 10 and executing the read programs. Like main memory 5, the sub-memory 10 is adapted to store the programs and data needed by the sub-CPU 9.

The sub-DMAC 11 performs a DMA transfer control operation on the devices on the sub-bus 2 only when the main bus 1 is disconnected from the sub-bus 2 by the bus controller 3 (that is, only in a closed state).

The ROM 12 stores boot programs for both the main CPU 4 and the sub-CPU 9, and an operating system, etc.

The SPU 13 receives packets transferred from the sub-CPU 9 or the sub-DMAC 11, and reads audio data from the sound memory 20, which stores the audio data, according to a sound command included in the packet. Subsequently, the SPU 13 supplies the audio data to a speaker unit, and causes the speaker unit to generate corresponding sounds.

The ATM communication portion 14 controls communication operations (that is, ATM communication operations) to be performed through a network (NW), such as a public line. Thus, a user of the video-game machine may transmit data directly to and receive data directly from a user of another video-game machine or may transmit data to and receive data from the latter user through the Internet or the center office of what is called a personal computer communication system. This enables a user of a video-game machine to play a game (for example, a battle game) on the network with a user of another video-game machine.

The auxiliary storage unit 15 is an optical disk drive unit, and enabled to reproduce (or read) information like programs and data recorded on optical disks, such as a CD-ROM, a CD-RW, a DVD-ROM, and a DVD-RW.

The input device I/F 16 is an interface for taking in signals corresponding to operations to be performed on an operation unit serving as a control pad and an external input image (video input) and audio signals (audio input) reproduced by other devices. Further, the input device I/F 16 outputs the external input signal onto the sub-bus 2.

When a main power supply is turned on, the main CPU 4 reads and executes the boot program from the ROM 12 in the video-game machine. Further, programs and data are read from a CD-ROM set in the auxiliary storage unit 15. Such programs and data are loaded into the main memory 5 and the sub-memory 10. Then, by executing the program in the main CPU 4 or the sub-CPU 9, the dynamic image and sounds of a game are reproduced.

Practically, the main CPU 4 generates polygon data for rendering polygons, which constitute a predetermined three-dimensional image, according to the data stored in the main memory 5. Then, the main CPU 4 encodes this polygon data into packets and supplies the packets to the GPU 8 through the main bus 1.

When receiving the polygon data, which is encoded into the packets, from the main CPU 4, the GPU 8 renders the polygons in the frame buffer 25 in sequence from the polygon according to an object to which the main CPU 4 issued an output instruction, by simultaneously performing Z-buffering by using the Z-buffer 26 illustrated in FIG. 2. The image rendered in the frame buffer 25 is suitably read by the GPU 8 and then outputted in the form of a video signal. Thus, the three-dimensional image for the game is displayed on the two-dimensional screen of a display apparatus.

On the other hand, the sub-CPU 9 generates a sound command, in response to which the generation of sounds is performed, according to the data stored in the sub-memory 10. Subsequently, the sub-CPU 10 encodes this sound command into packets and supplies the packets to the SPU 13 through the sub-bus 2. The SPU 13 reads sound data, which is stored in the sound memory 20, according to the sound command issued from the sub-CPU 9, and supplies this sound data to a speaker unit. Thus, sounds of BGM (Background Music) of the game and other kinds of sounds are radiated through the speaker unit.

When a three-dimensional image is rendered, the position of each of the polygons, which is represented by a floating or fixed decimal point number, is converted into an integer number so as to be made to correspond to a pixel located at a fixed position on the screen of the display apparatus. Thus, aliasing occurs by entailing stair-step-like distortions called "jaggies".

The video-game machine performs an operation of reducing jaggies, according to an antialiasing program. This antialiasing program is reproduced (or read) from a CD-ROM or DVD-ROM, etc. in the auxiliary storage unit 15 shown in FIG. 1. Alternatively, this program is downloaded by the ATM communication portion 14 from a storage medium 22 (such as a hard disk (HDD)) provided in the predetermined server apparatus 21 through the communication network NW such as the Internet.

Figure 3:
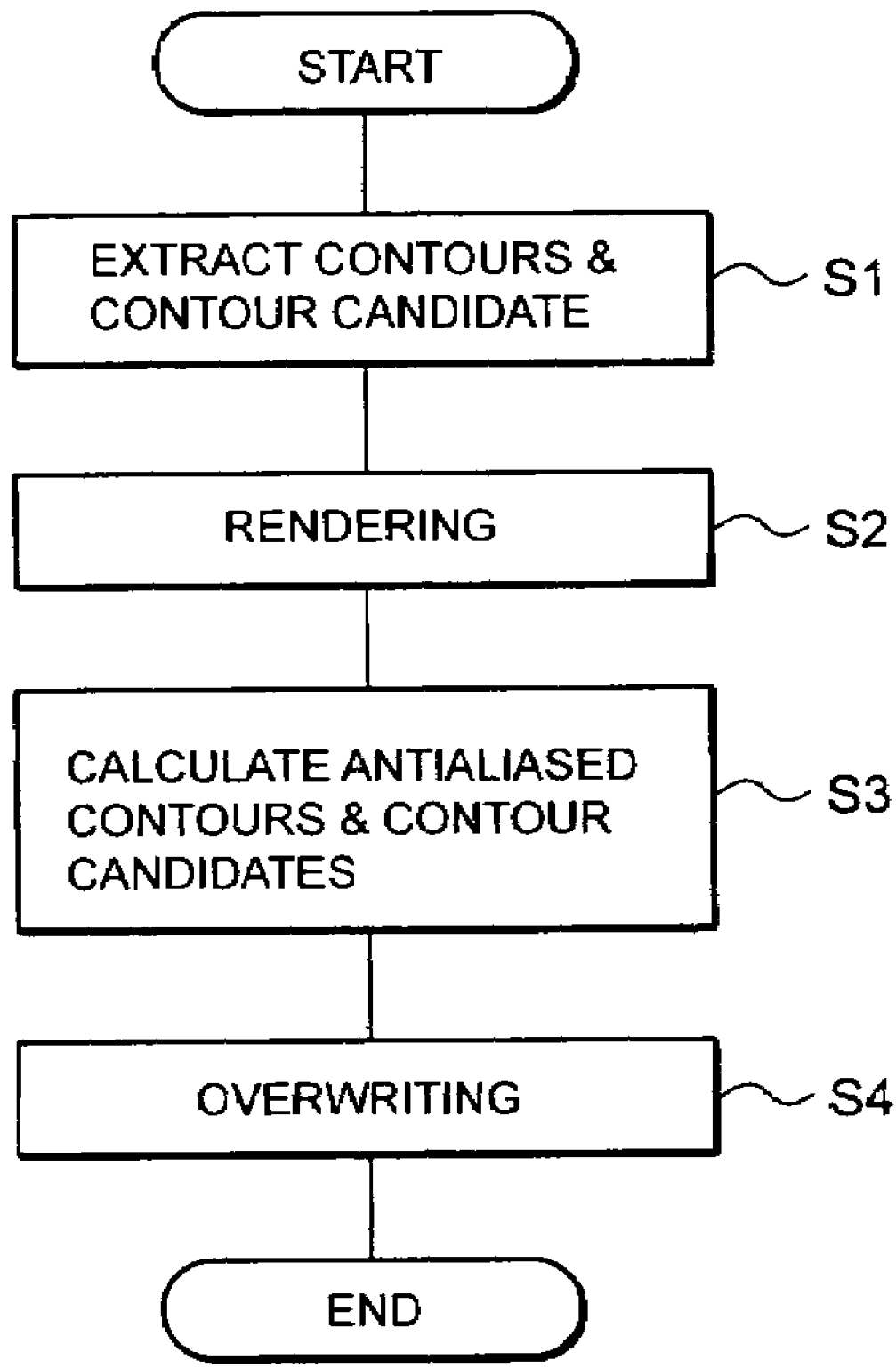
FIG. 3 is a flowchart illustrating an operation of reducing jaggies, which is performed in the video-game machine that is the embodiment of the invention.

This antialiasing program includes routines illustrated in the flowchart of FIG. 3. The execution of the antialiasing program illustrated in this flowchart is started when the program is loaded into the main memory 5 and put into an executable state after the main power supply is turned on and the program is received from the auxiliary storage unit 15 or the server apparatus 21 shown in FIG. 1.

Incidentally, it is assumed that data needed for rendering the polygon, such as data representing the shape of the polygon and data concerning the light source, are stored in the main memory 5 at that time.

At step S1, the main CPU 4 reads the polygon data, which is needed for rendering polygons that constitute a three-dimensional image of 1 frame, from the main memory 5 through the main bus 1 and then supplies or transfers the read polygon data to the GTE 17. Subsequently, the main CPU 4 extracts contours and contour candidates of the three-dimensional image to be rendered, if necessary, as line data or line strip data according to this polygon data. The extracted data is temporarily stored in the cache memory 18.

Figure 4:
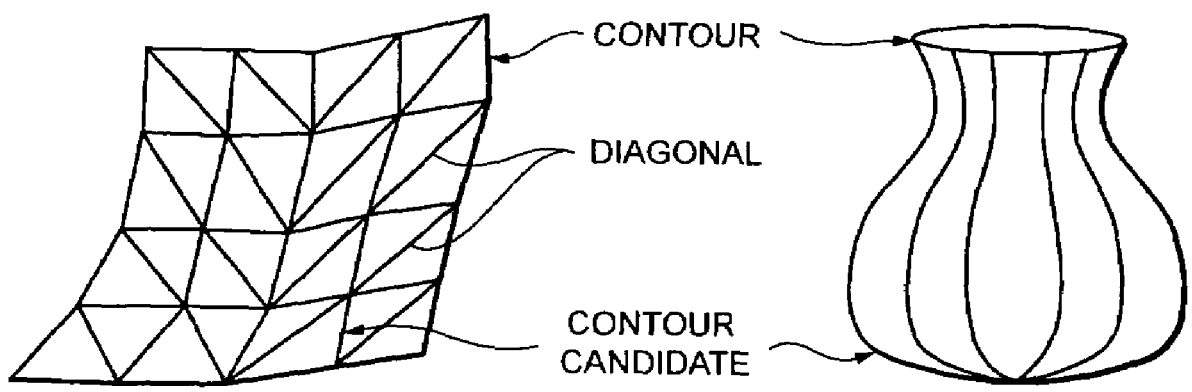
FIG. 4 is a view illustrating contours and contour candidates extracted from an image to be rendered in the operation of reducing jaggies.

FIG. 4 illustrates an example of the three-dimensional image for describing the contours and the contour candidates thereof. Referring to FIG. 4, the "contour" is an outline that becomes the outward form of an object independently of a direction from which the contour is seen in the three-dimensional space. In contrast, the "contour candidate" may be employed as such an outline that becomes or does not become the outward form of an object depending upon a direction from which the contour candidate is seen in the three-dimensional space. Such contours and contour candidates are "visually important lines" representing the parts of three-dimensional images such as edge portions of an object. It is preliminarily determined according to the three-dimensional image, which includes such lines, and the viewpoint what parts of the object respectively correspond to the "visually important lines", that is, what polygons respectively correspond to these lines. Consequently, the main CPU 4 extracts contours and contour candidates, if necessary, of the three-dimensional image as line (or curve) data or line strip data according to this polygon data, when transferring the polygon data to the GTE 17.

At step S1, the extraction of the "visually important lines" is performed. Thus, data representing lines, which have a low probability that these lines are the outlines of the object (that is, these lines are visually unimportant lines), are not extracted as line data or as line strip data.

Thus, at step S1, only necessary minimum line data or line strip data representing visually important portions are extracted. Further, as will be described later, antialiasing processing is performed on the extracted line data or line strip data. Therefore, the time required to perform antialiasing processing is reduced. Consequently, the speed, at which the entire three-dimensional image is rendered, is increased.

Next, at step S2, the main CPU 4 performs rendering processing. Practically, when supplied with the polygon data for rendering the polygons, the GTE 17 of the main CPU 4 performs geometry processing on each of the polygons in the three-dimensional space according to the position of the viewpoint. Moreover, the GTE 17 performs perspective projection conversion processing on the data having undergone the geometry processing. The "viewpoint" serving as a reference point for the geometry processing is given by the operation unit via the user.

Further, the main CPU 4 obtains the polygon data by calculating luminance and texture addresses corresponding to each of the polygons in a screen coordinate system upon completion of this perspective projection conversion. The main CPU 4 then supplies the polygon data to the GPU 8 through the main bus 1.

When supplied with the polygon data of 1 frame from the main CPU 4, the GPU 8 divides each of the pixels located at the coordinates of each of the vertices of the polygons into 16 sub-pixels (that is, one pixel is divided into a 4×4 matrix of sub-pixels). Then, the GPU 8 obtains RGB values of the sub-pixels of the sides and inner portions of the polygons by performing a DDA (Digital Differential Analyzer) operation with sub-pixel accuracy.

This DDA operation is a linear interpolation to be performed between two points so as to obtain the RGB value of each of pixels constituting a segment that connects the two points with each other. That is, according to this DDA operation, one of the two points is set as a starting point. The other point is set as an ending point. In addition, a certain value is preliminarily set at each of the starting point and the ending point. Then, a change in the value (or a rate of change thereof) at each of the pixels of the segment is obtained by dividing the difference between the values respectively set at the starting point and the ending point by the number of the pixels of the segment drawn between the starting point and the ending point. Then, the value of this rate of change is sequentially added (that is, accumulated) to each pixel between the starting point and the ending point. Thus, the values of the pixels of the segment drawn between the starting point and the ending point are obtained.

Consider the following example for providing values to sub-pixels p1, p2, and p3 of the three vertices apexes of a triangular polygon. First, such a DDA operation is performed on each of a set of the sub-pixels p1 and p2, and a set of the sub-pixels p2 and p3 and a set of the sub-pixels p1 and p3 with sub-pixel accuracy. Thus, the polygon data Z, R, G, B, S, T, and Q corresponding to the sub-pixels located on the three sides of this polygon, and the polygon data Z, R, G, B, S, T, and Q corresponding to the sub-pixels located in this polygon are obtained, by using X-coordinates and Y-coordinates thereof as variables.

The polygon data X, Y, and Z represent sets of X-coordinates, Y-coordinates and Z-coordinates of three vertices of the triangular polygon, respectively. Further, the polygon data R, G, and B represent the luminance values of red, green and blue colors at the three vertices of the polygon, respectively. Furthermore, the polygon data S, T, and Q represent texture coordinates (that is, homogeneous coordinates corresponding to the textures) at the three vertices of the triangular polygon.

The video-game machine of this embodiment is adapted so that a pattern (or material: a texture) is added to the surface of an object by texture mapping. Thus, the polygon data S, T, and Q are used in this texture mapping. The texture addresses are obtained by multiplying each of the values S/Q and T/Q by a texture size.

Subsequently, the GPU 8 writes the RGB values of the pixels of the polygon to the frame buffer 25 by using the Z-buffer 26. Practically, the GPU 8 obtains final RGB values to be written to this frame buffer 25 as follows.

That is, the GPU 8 calculates the texture addresses U (S/Q) and V (T/Q) by dividing the polygon data S and T by the polygon data Q when performing the texture mapping according to the polygon data X, Y, Z, R, G, B, S, T, and Q (obtained as a result of performing the DDA operation) of a prime sub-pixel of the sub-pixels which is allocated at the central of the polygons. Moreover, if necessary, the GPU 8 performs various kinds of filtering processing. Thus, the color data of textures at the X-coordinate and the Y-coordinate of each of the sub-pixels are calculated. Then, texture color data corresponding to the texture addresses U and V are read from the texture memory 27.

Subsequently, the GPU 8 calculates final RGB values of each of the sub-pixels by performing filtering processing by mixing the RGB values of this texture color data and those obtained as a result of performing the DDA operation at a predetermined mixture ratio. Thus, polygons are constituted. Then, the GPU 8 writes the final RGB values to the frame buffer 25. Incidentally, the GPU 8 writes the RGB values to the frame buffer 25 by simultaneously performing Z-buffering by the use of the Z-buffer 26.

Figure 5:
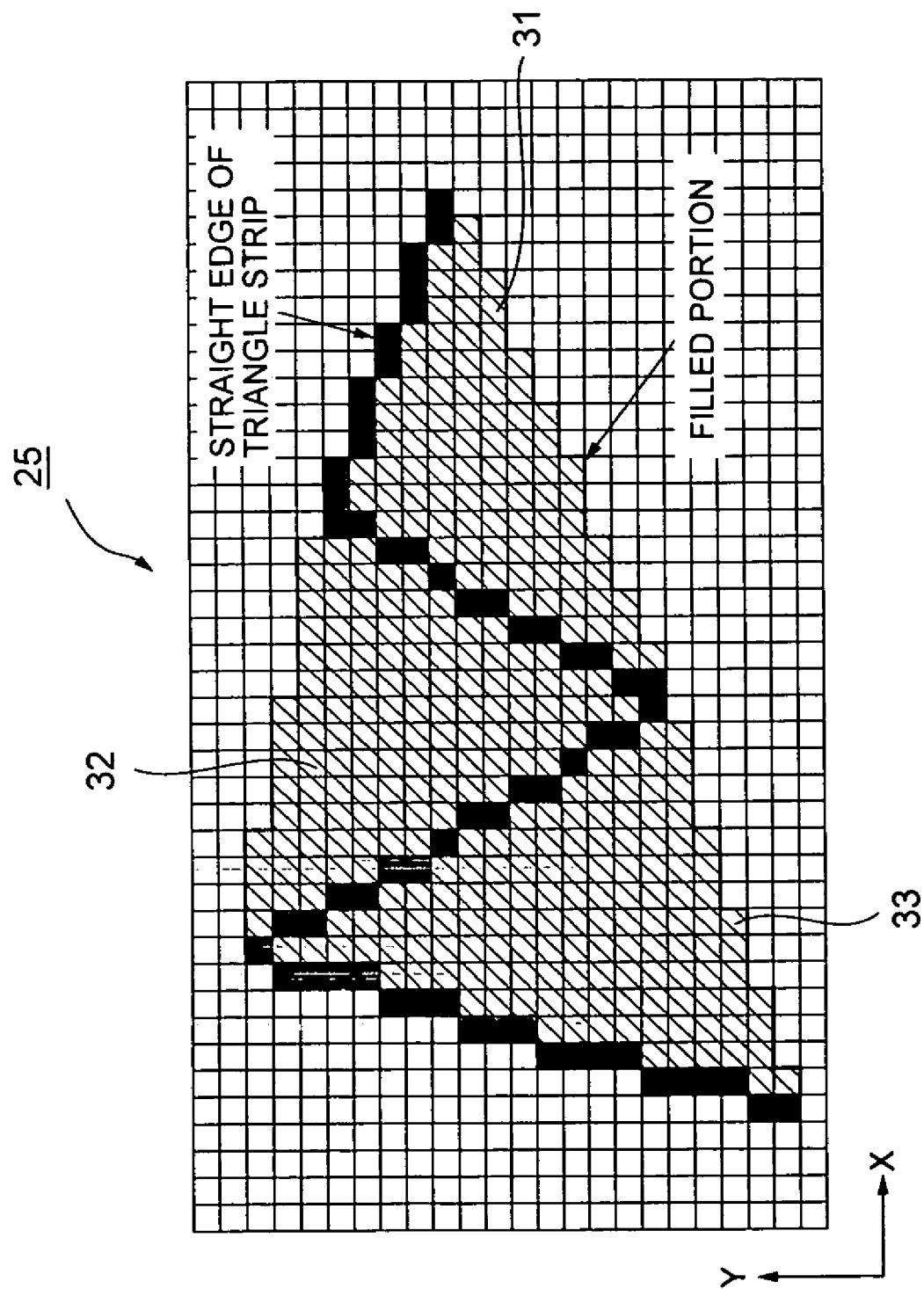
FIG. 5 is a view illustrating an image to be written to a frame buffer of the graphic memory without performing antialiasing thereon.

FIG. 5 shows an example of an image rendered in the frame buffer 25 in this manner. This image shown in FIG. 5 is rendered by pasting three triangle polygons (triangle strips) 31 to 33 together so that the entire resultant polygon has a triangular shape.

In FIG. 5, each square "□" corresponds to one pixel. A filtering operation is performed on each pixel by mixing the RGB value of the texture color data and that obtained as a result of performing the DDA operation at a predetermined mixture ratio. Thus, an image of a triangle is rendered by the entire polygon formed by performing such a filtering operation on each pixel.

For readily seeing the boundaries between the triangle polygons 31, 32 and 33, each of the pixels of the straight edges (or lines) of the polygons 31 to 33 is indicated by a black square "■" in FIG. 5. Further, the image rendered in the frame buffer 25 in this stage does not undergo the antialiasing processing. It follows that aliasing occurs in the image.

When a predetermined image is rendered in the frame buffer 25 in this way, control advances to step S3 of this flowchart. At this step S3, the CPU 8 performs antialiasing process according to the contours and contour candidates extracted at step S1.

As described above, when transferring the polygon data to the GTE 17, the main CPU 4 extracts the contours, together with the contour candidates if necessary, according to this polygon data as line (or curve) data or line strip data. The extracted data is stored in the cache memory 18. Subsequently, when control advances to step S3, the main CPU 4 reads the line data or the line strip data stored in the cache memory 18 and supplies the read data to the GPU 8. Then, the GPU 8 obtains the ratio (that is, an occupancy rate) of the area occupied by a straight line to that of the area of each of pixels, through which the straight line passes, as an α-value (α) of each of such pixels. Furthermore, the GPU 8 calculates the pixel value of each of the pixels according to the following equation by using the α-value thereof:

(Pixel Value)=(Source Color)×α+(Destination Color)×(1−α)

That is, a "Pixel Value" is obtained by adding the "Source Color" multiplied by an "α-value" and the "Destination Color" multiplied by the value "1−α-value". Then, an a-blending processing (to be described later) is performed by obtaining the pixel value according to this equation.

Figure 6:
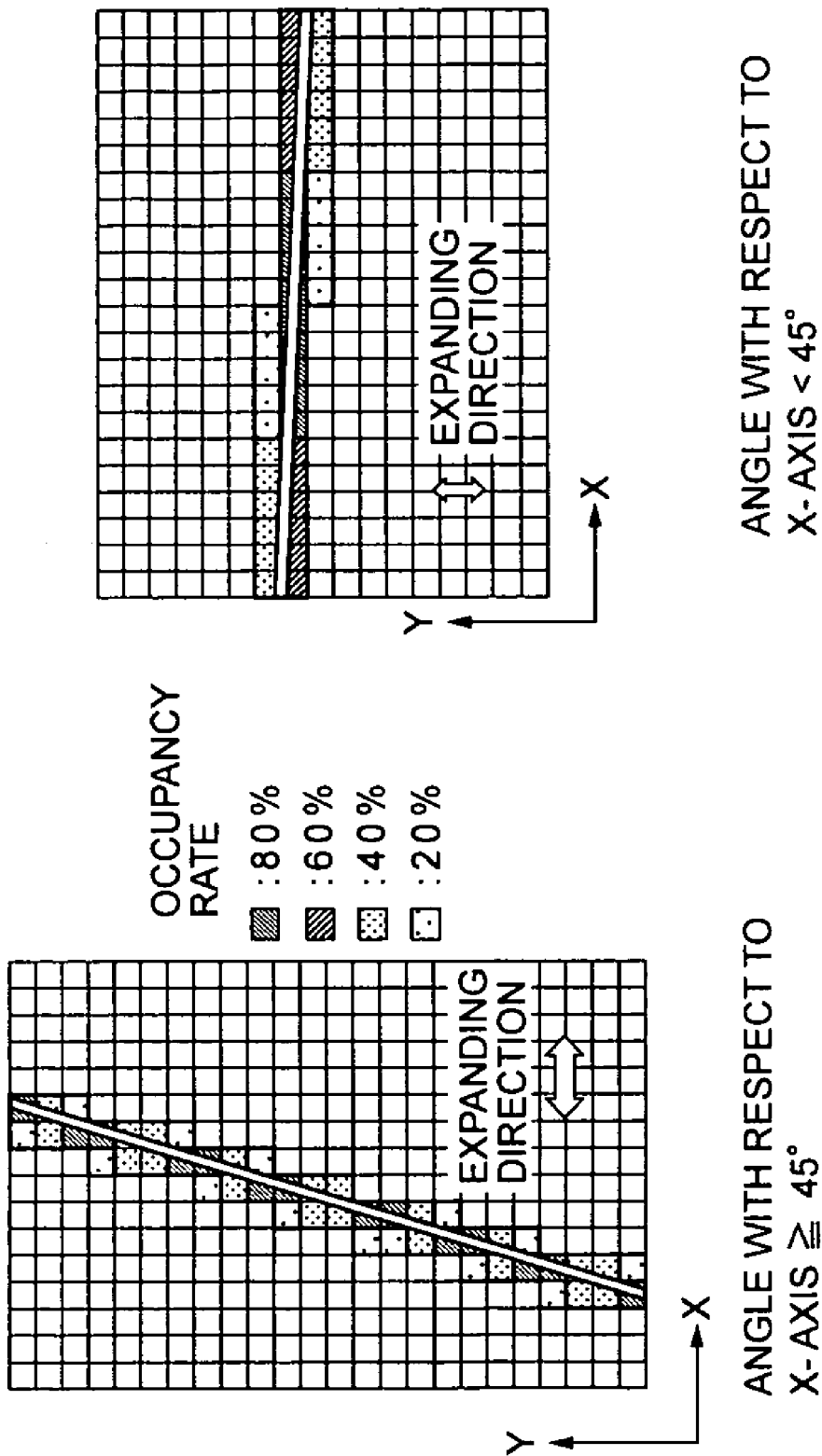
FIGS. 6A and 6B are views illustrating an antialiasing operation to be performed on the extracted contours and contour candidates.

FIG. 6A shows the occupancy rate of each of the pixels in the case that an angle, which a straight line to be rendered forms with the X-axis, is equal to or more than a predetermined value (in this case, 45 degrees). FIG. 6B shows the occupancy rate of each of the pixels in the case that an angle, which a straight line to be rendered forms with the X-axis, is less than the predetermined value (in this case, 45 degrees). In FIGS. 6A and 6B, for readily understanding of the invention, an ideal straight line to be rendered is illustrated as a hollow straight line. Further, in the case that an ideal line to be rendered is a curved line, the angle, which the line to be rendered forms with the X-axis, is evaluated by approximating this curved line to be a straight line in each of the pixels.

As is understood from FIG. 6A, in the case that an angle, is equal to or more than 45 degrees, objects to be rendered are pixels that each include a part of the line and adjoin with each other in the direction of the X-axis. That is, the range of pixels, in which the straight line (that is, to which antialiasing process is performed) is rendered, is expanded and obtained along the direction of the X-axis. Similarly, as is understood from FIG. 6B, in the case that an angle, is less than 45 degrees, objects to be rendered are pixels that each include a part of the line and adjoin with each other in the direction of the Y-axis. That is, the range of pixels, in which the straight line is rendered, is expanded and obtained along the direction of the Y-axis. Further, the GPU 8 calculates the occupancy rate of the straight line corresponding to each of the pixels to be rendered and obtains values, such as 20%, 40%, 60%, and 80%, as the calculated occupancy rate. Moreover, the GPU 8 performs the operation based on the aforementioned equation (that is, performs the α-blending processing) on the pixel values by using the calculated occupancy rate as the α-value.

The α-values of the pixels to be rendered, which adjoin with each other in the direction of the X-axis or Y-axis), are set so that a total of the α-values of such pixels is 100%.

Furthermore, in the case of this example, for simplicity of description, the foregoing description of calculation of the pixel values has been given by employing only four kinds of values, that is, 20%, 40%, 60%, and 80% as the values of the occupancy rates. However, the actual occupancy rate is set according to the resolution of sub-pixels. For instance, in the case of calculating the pixel values by dividing each of the pixels into 16 sub-pixels (that is, a 4×4 matrix of sub-pixels), the occupancy rate is set by employing a 16-level resolution so that the number of resolution levels, which are, for instance, 6.25%, 12.5%, 18.75%, . . . , is equal to the number of the sub-pixels of each pixel.

Figure 7:
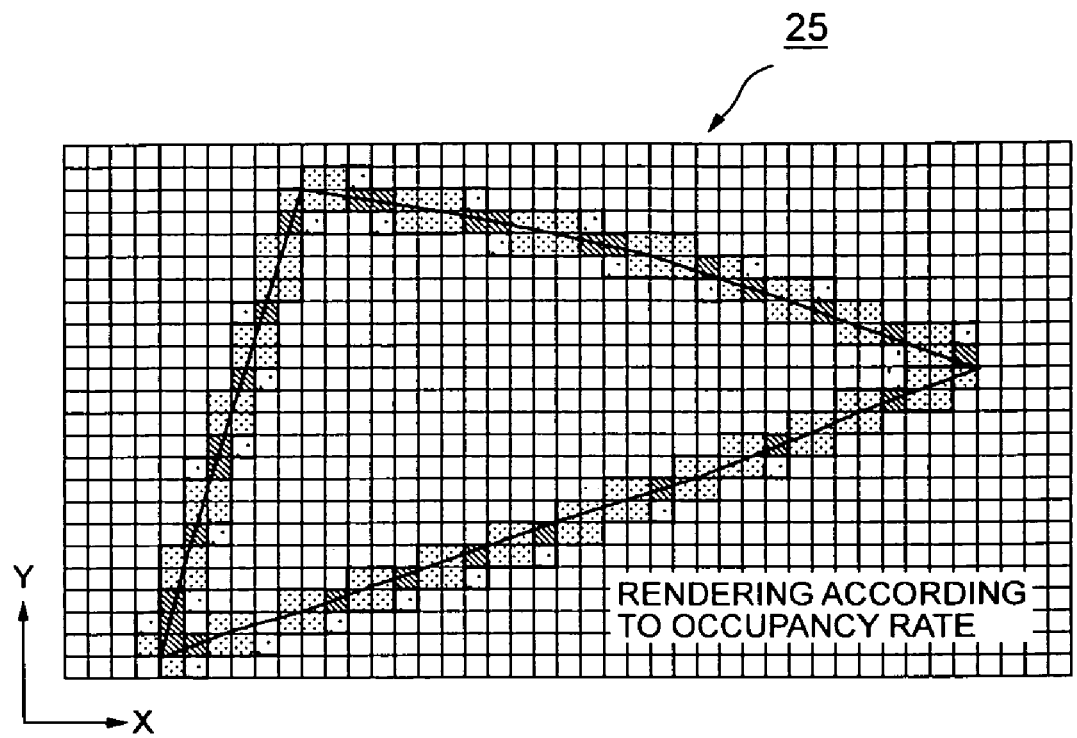
FIG. 7 is a view illustrating the antialiased contours and contour candidates.

FIG. 7 illustrates only the contours (or contour candidates), which are rendered by calculating the pixel values, such as RGB values, according to the occupancy rates of the ideal line and extracted from the aforementioned example. As shown in FIG. 7, a gradational image of each of the contours (or contour candidates) is thus obtained by performing the α-blending processing on the contours (or contour candidates). Consequently, antialiased less-jaggy smooth contours (or contour candidates) are rendered.

As described above, the video-game machine of this embodiment is adapted in such a way as to calculate the occupancy rate with sub-pixel accuracy. Thus, the video-game machine of this embodiment is enabled to calculate the occupancy rate with finer accuracy, as compared with the conventional machine that calculates the occupancy rate correspondingly to each of the pixels. Consequently, in the case of this embodiment, the contours (or contour candidates) are rendered according to more suitable pixel values. Hence, much-less-jaggy smooth contours (or contour candidates) to be rendered are obtained.

Subsequently, when the antialiased contours (or contour candidates) are thus formed, the GPU 8 advances to step S4 shown in the flowchart of FIG. 3, whereupon overwriting of the pixel values is performed. Practically, the GPU 8 overwrites the pixel values, which are calculated by performing the α-blending processing, onto the pixel values of the pixels corresponding to the contours (or contour candidates) in the image written to the frame buffer 25. That is, an image to finally be rendered is obtained by performing antialiasing on a part of an original image. This overwriting processing is performed by simultaneously referring to the Z-values of the contours (or contour candidates), which are stored in the Z-buffer 26.

Figure 8:
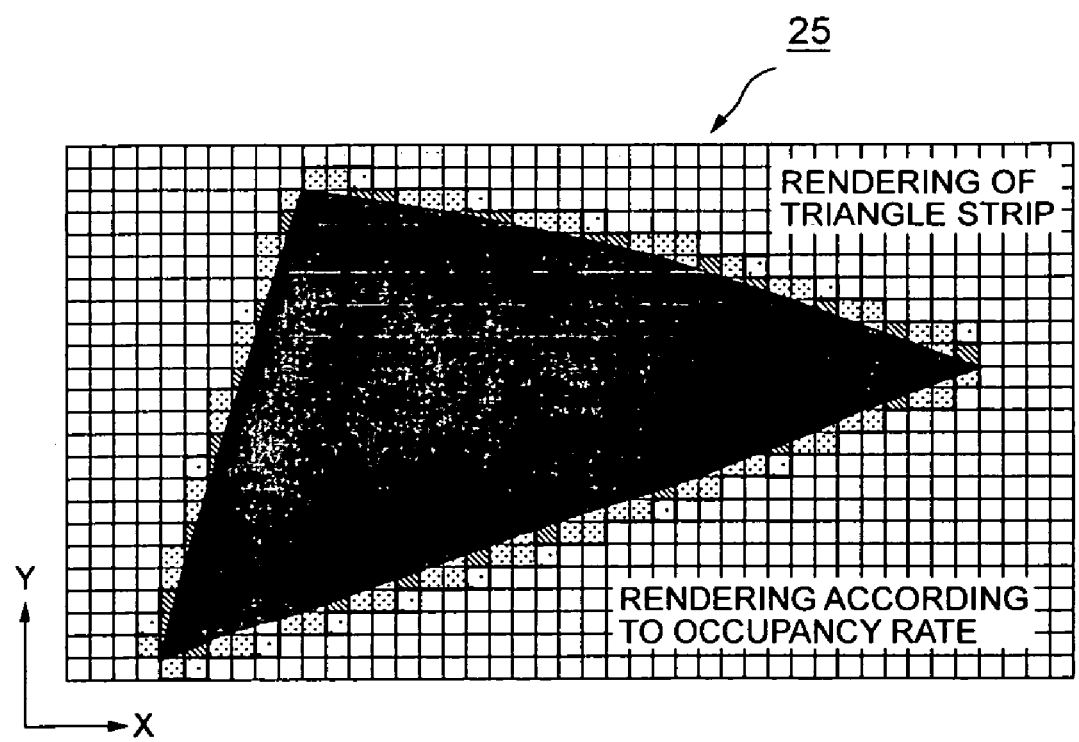
FIG. 8 is a view illustrating an image obtained by overwriting the antialiased contours and contour candidates onto the image written to the frame buffer.

Thus, data representing an image having the antialiased contours (or contour candidates) as shown in FIG. 8 are written onto the frame buffer 2. The GPU 8 reads data representing the image of 1 frame written to the frame buffer 25 and supplies a signal representing the read data to the display apparatus as a video signal. Consequently, a three-dimensional image having antialiased smooth contours (or contour candidates) is displayed on the screen of the display apparatus.

The routines illustrated in the flowchart of FIG. 3 are continuously executed correspondingly to each frame during a game. Thus, all the three-dimensional images displayed during the game are less-jaggy images.

Although the video-game machine according to this embodiment employs what is called a Z-buffer method according to which the image is rendered in the frame buffer 25 by using the Z-buffer 26 and performing Z-buffering, the video-game machine may be adapted to perform Z-sorting at step S4 before the data representing the antialiased contours (or contour candidates) is overwritten onto the data stored in the frame buffer 25. That is, a much-less-jaggy high-picture-quality three-dimensional image is formed by performing, after the Z-sorting is performed on the contours (or contour candidates), antialiasing thereon and then overwriting the data representing the antialiased contours (or contour candidates) onto the data stored in the frame buffer 25.

As is apparent from the foregoing description, the video-game machine of this embodiment first extracts visually important portions, such as contours or contour candidates, of an image to be rendered. Then, this machine performs antialiasing processing on the extracted contours or contour candidates. Subsequently, this machine overwrites data representing the antialiased contours or contour candidates onto the data representing the original image. Thus, jaggies are reduced by performing antialiasing processing partially on the visually important portions, such as the contours or contour candidates, of the image. Consequently, a less-jaggy high-picture-quality image is obtained.

Further, because this embodiment is adapted so that the antialiasing processing is performed only on the visually important limited portion of the entire image, the antialiasing processing is performed on the image at a very high speed even when inexpensive hardware is employed. Therefore, antialiasing processing can be performed on a dynamic image to be displayed, which is composed of, for example, 20 to 30 frames per second, in realtime. Moreover, inexpensive hardware may be employed in the video-game machine. Thus, the invention provides a video-game machine of a low-cost simple configuration, which is enabled to perform antialiasing processing on a dynamic image.

Furthermore, even when the video-game machine according to this embodiment does not have a large-capacity high-speed frame buffer and Z-buffer, this machine is enabled to perform antialiasing processing on a dynamic image. Thus, such a vide-game machine is realized by having a low-cost, small-sized configuration.

Furthermore, this embodiment is adapted to selectively perform only on the visually important portions of the entire image. Thus, this embodiment eliminates the necessity for a grouping operation, such as a sorting operation, which is needed for performing antialiasing on triangle polygons in the conventional machine.

This embodiment is illustrative, and the invention is not limited thereto. For example, in the foregoing description of this embodiment, the case, in which the invention is applied to a video-game machine, has been described. However, the invention may be applied to an effector for providing special effects for an image, and to a computer graphic system such as a CAD system.

Further, the invention may be applied to a recording/reproducing apparatus for recording and reproducing an image, which is taken by a video camera, by coding the image so that the image is represented by polygons, and to a transmission system for transmitting and receiving an image coded in such a way as to be represented by polygons.

In this case, an antialiased high-picture-quality reproduction image is obtained by employing the techniques according to the invention when the image coded in such a way as to be represented by polygons is decoded.

Furthermore, although it has been described in the foregoing description of the aforementioned embodiment that rendering is performed in units of frames, the rendering processing may be performed in units of fields. Additionally, the invention may be applied to the case of rendering any of a dynamic image, a static image, and three-dimensional and two-dimensional graphics.

Besides, although it has been described in the foregoing description of the aforementioned embodiment that the rendering processing is performed by executing a computer program for reducing jaggies in a processor, the rendering processing may be performed by providing hardware dedicated to the rendering processing and using this hardware.

Further, although it has been described in the foregoing description of the aforementioned embodiment that the antialiased three-dimensional image is displayed on the screen of the display apparatus by being outputted thereto, such an image may be outputted to a two-dimensional output apparatus, such as a printer apparatus, and then printed therein.

Furthermore, although it has been described in the foregoing description of the aforementioned embodiment that the antialiasing processing is achieved by performing the $\alpha$-blending processing, other antialiasing techniques may be employed instead of such a technique of the embodiment. Further, the apparatus of the invention is adapted to form an antialiasing image at a high speed by selectively performing antialiasing processing on a visually important portion of the image. Thus, even in the case of employing other antialiasing techniques, advantageous effects similar to those of the embodiment are obtained as long as an antialiased image is formed at a high speed by selectively performing the antialiasing processing.

Needless to say, various other modifications may be made without departing from the spirit and scope of the invention.

As described above, the apparatus of the invention has a low-cost, small-sized configuration and is, however, enabled to form an antialiased high-picture-quality image at a high speed. Consequently, the apparatus of the invention is enabled to perform antialiasing processing on a dynamic image in real time.

The invention claimed is:

1. An image rendering apparatus, comprising:
   extracting means for determining that a given line part of an object depicted in a three-dimensional image is a visually important line part, the visually important line part being a contour line of the depicted object or a contour candidate line of the depicted object, and for extracting only data representing the visually important line part from data representing the three-dimensional image;
   image rendering means for rendering the three-dimensional image to generate respective pluralities of first values for each pixel in the three-dimensional image whereby a given one of the pluralities of first values is associated with a specific one of the pixels in the three-dimensional image, the rendered image including a portion in which aliasing occurs;
   antialiasing means for antialiasing only the extracted data to form an antialiased image portion associated with the visually important line part by generating respective pluralities of second values for each pixel in the visually important line part whereby a given one of the pluralities of second values is associated with a specific one of the pixels in the visually important line part; and
   overwriting means for overwriting by using the pluralities of second values associated with each pixel of the visually important line part to replace the pluralities of first values associated with each pixel of the visually important line part thereby at least reducing the aliasing of the portion of the rendered image.

2. An image rendering apparatus according to claim 1, wherein said image rendering means renders the three-dimensional image using polygon data that represents the three-dimensional image, and said extracting means extracts only the data representing the visually important line part by extracting corresponding data from the polygon data, the corresponding data being selected from the group consisting of line data, curve data and line strip data.

3. An image rendering apparatus according to claim 1, wherein the visually important line part passes through a plurality of pixels, and said antialiasing means generates pixel values for each of the plurality of pixels as a function of an occupancy value of that pixel, the occupancy value of a respective pixel being based on a ratio of an area of an occupied portion of the pixel to an area of the pixel, the area of the occupied portion of the pixel being based on an area occupied by a portion of the visually important line part that passes through the pixel when the visually important line part is a straight line or being based on an area occupied by an ideal straight line segment which approximates the portion of the visually important line part when the visually important line part is curved.

4. An image rendering apparatus according to claim 3, wherein the portion of the visually important line part or the ideal straight line segment forms an angle with an X-axis, and said antialiasing means antialiases a range of pixels along the X-axis when the angle is equal to or larger than a predetermined value and antialiases a range of pixels along a Y-axis that is orthogonal to the X-axis when the angle is smaller than the predetermined value.

5. An image rendering apparatus according to claim 3, wherein each of the plurality of pixels is divided into a matrix of sub-pixels, and said antialiasing means determines the area of the occupied portion of the pixel in units of sub-pixel areas.

6. An image rendering method, comprising:
   determining that a given line part of an object depicted in a three-dimensional image is a visually important line part, the visually important line part being a contour line of the depicted object or a contour candidate line of the depicted object;
   extracting only data representing the visually important line part from data representing the three-dimensional image;
   rendering the three-dimensional image to generate respective pluralities of first values for each pixel in the three-dimensional image whereby a given one of the pluralities of first values is associated with a specific one of the pixels in the three-dimensional image, the rendered image including a portion in which aliasing occurs;
   antialiasing only the extracted data to generate respective pluralities of second values for each pixel in the visually important line part whereby a given one of the pluralities of second values is associated with a specific one of the pixels in the visually important line part; and
   overwriting by using the pluralities of second values associated with each pixel of the visually important line part to replace the pluralities of first values associated with each pixel of the visually important line part thereby at least reducing the aliasing of the portion of the rendered image.

7. An image rendering method according to claim 6, wherein said step of rendering an image includes rendering the three-dimensional image using polygon data that represents the three-dimensional image, and said step of extracting only the data representing the visually important line part includes extracting corresponding data from the polygon data, the corresponding data being selected from the group consisting of line data, curve data and line strip data.

8. An image rendering method according to claim 6, wherein the visually important line part passes through a plurality of pixels, and said step of forming the antialiased image portion includes generating pixel values for each of the plurality of pixels as a function of an occupancy value of that pixel, the occupancy value of a respective pixel being based on a ratio of an area of an occupied portion of the pixel to an area of the pixel, the area of the occupied portion of the pixel being based on an area occupied by a portion of the visually important line part that passes through the pixel when the visually important line part is a straight line or being based on an area occupied by an ideal straight line segment which approximates the portion of the visually important line part when the visually important line part is curved.

9. An image rendering method according to claim 8, wherein the portion of the visually important line part or the ideal straight line segment forms an angle with an X-axis, and said step of forming the antialiased image portion includes antialiasing a range of pixels along the X-axis when the angle is equal to or larger than a predetermined value and antialiasing a range of pixels along a Y-axis that is orthogonal to the X-axis when the angle is smaller than the predetermined value.

10. An image rendering method according to claim 8, wherein each of the plurality of pixels is divided into a matrix of sub-pixels, and said step of forming the antialiased image portion includes determining the area of the occupied portion of the pixel in units of sub-pixel areas.

11. A computer-readable storage medium having instructions stored therein for operating an apparatus to perform an image rendering method, said method comprising:
    determining that a given line part of an object depicted in a three-dimensional image is a visually important line part, the visually important line part being a contour line of the depicted object or a contour candidate line of the depicted object;
    extracting only data representing the visually important line part from data representing the three-dimensional image;
    rendering the three-dimensional image to generate respective pluralities of first values for each pixel in the three-dimensional image whereby a given one of the pluralities of first values is associated with a specific one of the pixels in the three-dimensional image, the rendered image including a portion in which aliasing occurs;
    antialiasing only the extracted data to generate respective pluralities of second values for each pixel in the visually important line part whereby a given one of the pluralities of second values is associated with a specific one of the pixels in the visually important line part; and
    overwriting by using the pluralities of second values associated with each pixel of the visually important line part to replace the pluralities of first values associated with each pixel of the visually important line part thereby at least reducing the aliasing of the portion of the rendered image.

12. A storage medium according to claim 11, wherein said step of rendering an image includes rendering the three-dimensional image using polygon data that represents the three-dimensional image, and said step of extracting only the data representing the visually important line part includes extracting corresponding data from the polygon data, the corresponding data being selected from the group consisting of line data, curve data and line strip data.

13. A storage medium according to claim 11, wherein the visually important line part passes through a plurality of pixels, and said step of forming the antialiased image portion includes generating pixel values for each of the plurality of pixels as a function of an occupancy value of that pixel, the occupancy value of a respective pixel being based on a ratio of an area of an occupied portion of the pixel to an area of the pixel, the area of the occupied portion of the pixel being based on an area occupied by a portion of the visually important line part that passes through the pixel when the visually important line part is a straight line or being based on an area occupied by an ideal straight line segment which approximates the portion of the visually important line part when the visually important line part is curved.

14. A storage medium according to claim 13, wherein the portion of the visually important line part or the ideal straight line segment forms an angle with an X-axis, and said step of forming the antialiased image portion includes antialiasing a range of pixels along the X-axis when the angle is equal to or larger than a predetermined value and antialiasing a range of pixels along a Y-axis that is orthogonal to the X-axis when the angle is smaller than the predetermined value.

15. A storage medium according to claim 13, wherein each of the plurality of pixels is divided into a matrix of sub-pixels, and said step of forming the antialiased image portion includes determining the area of the occupied portion of the pixel in units of sub-pixel areas.

16. A server apparatus, comprising:
    a computer-readable storage medium for storing instructions for operating an apparatus to perform an image rendering method; and
    distributing means for distributing the instructions stored on the computer-readable storage medium;
    wherein the method includes:
        determining that a given line part of an object depicted in a three-dimensional image is a visually important line part, the visually important line part being a contour line of the depicted object or a contour candidate line of the depicted object;
        extracting only data representing the visually important line part from data representing the three-dimensional image;
        rendering the three-dimensional image to generate respective pluralities of first values for each pixel in the three-dimensional image whereby a given one of the pluralities of first values is associated with a specific one of the pixels in the three-dimensional image, the rendered image including a portion in which aliasing occurs;
        antialiasing only the extracted data to generate respective pluralities of second values for each pixel in the visually important line part whereby a given one of the pluralities of second values is associated with a specific one of the pixels in the visually important line part; and overwriting by using the pluralities of second values associated with each pixel of the visually important line part to replace the pluralities of first values associated with each pixel of the visually important line part thereby at least reducing the aliasing of the portion of the rendered image.

17. A computer-readable storage medium having instructions stored therein for operating an apparatus to perform an image rendering method, said method comprising:

determining that a given line part of an object depicted in a three-dimensional image is a visually important line part, the visually important line part being a contour line of the depicted object or a contour candidate line of the depicted object;

extracting a portion of data from data representing the three-dimensional image, the portion of data representing only the visually important line part;

rendering the three-dimensional image to generate respective pluralities of first values for each pixel in the three-dimensional image whereby a given one of the pluralities of first values is associated with a specific one of the pixels in the three-dimensional image, the rendered image including a portion in which aliasing occurs;

antialiasing only the extracted data to generate respective pluralities of second values for each pixel in the visually important line part whereby a given one of the pluralities of second values is associated with a specific one of the pixels in the visually important line part; and overwriting by using the pluralities of second values associated with each pixel of the visually important line part to replace the pluralities of first values associated with each pixel of the visually important line part thereby at least reducing the aliasing of the portion of the rendered image.

18. A computer-readable storage medium according to claim 17, wherein said step of rendering the image includes rendering the three-dimensional image using polygon data that represents the three-dimensional image, and said step of extracting the portion of data representing only the visually important line part includes extracting corresponding data from the polygon data, the corresponding data being selected from the group consisting of line data, curve data and line strip data.

19. An image rendering apparatus, comprising:

extracting means for determining that a given line part of an object depicted in a three-dimensional image is a visually important line part, the visually important line part being a contour line of the depicted object or a contour candidate line of the depicted object, and for extracting a portion of data from data representing the three-dimensional image, the portion of data representing only the visually important line part;

rendering means for rendering the three-dimensional image to generate respective pluralities of first values for each pixel in the three-dimensional image whereby a given one of the pluralities of first values is associated with a specific one of the pixels in the three-dimensional image, the rendered image including a portion in which aliasing occurs;

antialiased image forming means for generating respective pluralities of second values for each pixel in the visually important line part of the depicted object by antialiasing only the extracted data whereby a given one of the pluralities of second values is associated with a specific one of the pixels in the visually important line part; and overwriting means for overwriting by using the pluralities of second values associated with each pixel of the visually important line part to replace the pluralities of first values associated with each pixel of the visually important line part thereby at least reducing the aliasing of the portion of the rendered image.

20. An image rendering apparatus according to claim 19, wherein said rendering means renders the three-dimensional image using polygon data that represents the three-dimensional image, and said extracting means extracts the portion of data representing only the visually important line part by extracting corresponding data from the polygon data, the corresponding data being selected from the group consisting of line data, curve data and line strip data.

21. An image rendering method, comprising:

determining that a given line part of an object depicted in a three-dimensional image is a visually important line part, the visually important line part being a contour line of the depicted object or a contour candidate line of the depicted object;

extracting a portion of data from data representing a three-dimensional image, the portion of data representing only the visually important line part;

rendering the three-dimensional image to generate respective pluralities of first values for each pixel in the three-dimensional image whereby a given one of the pluralities of first values is associated with a specific one of the pixels in the three-dimensional image, the rendered image including a portion in which aliasing occurs;

generating respective pluralities of second values for each pixel in the visually important line part of the depicted object by antialiasing only the extracted data whereby a given one of the pluralities of second values is associated with a specific one of the pixels in the visually important line part; and overwriting by using the pluralities of second values associated with each pixel of the visually important line part to replace the pluralities of first values associated with each pixel of the visually important line part thereby at least reducing the aliasing of the portion of the rendered image.

22. An image rendering method according to claim 21, wherein said step of rendering the image includes rendering the three-dimensional image using polygon data that represents the three-dimensional image, and said step of extracting the portion of data representing only the visually important line part includes extracting corresponding data from the polygon data, the corresponding data being selected from the group consisting of line data, curve data and line strip data.

* * * * *

UNITED STATES PATENT AND TRADEMARK OFFICE
CERTIFICATE OF CORRECTION

| | |
|---|---|
| PATENT NO. | : 7,212,215 B2 |
| APPLICATION NO. | : 09/935891 |
| DATED | : May 1, 2007 |
| INVENTOR(S) | : Nobuo Sasaki and Masaaki Oka |

Page 1 of 1

It is certified that error appears in the above-identified patent and that said Letters Patent is hereby corrected as shown below:

Column 10, line 41, "a-blending" should read --α-blending--.

Signed and Sealed this

Fifteenth Day of April, 2008

JON W. DUDAS
*Director of the United States Patent and Trademark Office*